US012768494B1

(12) United States Patent
Anderson

(10) Patent No.: US 12,768,494 B1
(45) Date of Patent: Oct. 20, 2026

(54) SYSTEM FOR MOVING INSTRUMENTS MOUNTED ON A TOWER

(71) Applicant: Tower Systems, Inc., Watertown, SD (US)

(72) Inventor: Eric Anderson, Watertown, SD (US)

(73) Assignee: TOWER SYSTEMS, INC., Watertown, SD (US)

( * ) Notice: Subject to any disclaimer, the term of this patent is extended or adjusted under 35 U.S.C. 154(b) by 0 days.

(21) Appl. No.: 19/345,612

(22) Filed: Sep. 30, 2025

(51) Int. Cl.
*F16M 13/02* (2006.01)
*E04H 12/00* (2006.01)

(52) U.S. Cl.
CPC ........... *F16M 13/022* (2013.01); *E04H 12/00* (2013.01)

(58) Field of Classification Search
CPC .............................. E04H 12/00; F16M 13/022
See application file for complete search history.

(56) References Cited

FOREIGN PATENT DOCUMENTS

| | | | | |
|---|---|---|---|---|
| CN | 203551302 U | * | 4/2014 | |
| CZ | 27515 U1 | * | 12/2014 | |
| EP | 3670784 A1 | * | 6/2020 | F03D 80/00 |
| KR | 20120021548 A | * | 3/2012 | B66B 9/16 |
| KR | 101182676 B1 | * | 9/2012 | F03D 80/00 |

OTHER PUBLICATIONS

Machine Translation of EP 3670784.*
Machine Translation of CZ 27515.*

* cited by examiner

*Primary Examiner* — Diem M Tran
(74) *Attorney, Agent, or Firm* — Ballard Spahr LLP

(57) ABSTRACT

A drive system for a tower elevator is disclosed. The drive system comprises a winch directly and operably coupled to a drive motor. The drive system comprises at least one sheave. A drive cable is wound around the winch and at least one sheave. The drive cable is configured to couple to a carriage. The winch is configured to drive the drive cable to move the carriage up and down a tower. The at least one sheave is positioned to guide the drive cable along the tower.

17 Claims, 9 Drawing Sheets

SYSTEM FOR MOVING INSTRUMENTS MOUNTED ON A TOWER

FIELD

This disclosure relates to a system for raising and lowering instruments mounted on a tower.

BACKGROUND

Tall freestanding towers are used for many different purposes, including, for example, telecommunications and broadcasting, providing infrastructure, supporting antennas and/or scientific instruments, etc. For example, a weather tower, meteorological tower, or met tower, is a tall, free-standing structure equipped with instruments to measure weather conditions at various heights above the ground. The instruments collect valuable data for weather forecasting, climate research, and specialized applications like wind energy assessment. As shown in FIG. 1, climbing a tower 5, for example to collect data and/or perform maintenance, repairs or calibration on weather instrumentation, is a high-risk activity that requires specialized safety equipment and extensive training. To avoid putting the technician 7 at risk, alternative methods like remote-controlled elevators have been used. For example, as shown in FIG. 2, the instruments 10 may be located on an elevator 12 that may be raised and lowered via controls at ground level. However, due to the configuration of the controls and carriages that carry the instruments, ladders may still be required to allow technicians to access certain components. Further, as shown in FIG. 3, the drive system 16 for the elevators 12 may use pulley and belt systems 18 that may not be reliable and have limited longevity due to rusting.

SUMMARY

A drive system for a tower elevator is disclosed. The drive system comprises a winch directly and operably coupled to a drive motor. The drive system comprises at least one sheave. A drive cable is wound around the winch and at least one sheave. The drive cable is configured to couple to a carriage. The winch is configured to drive the drive cable to move the carriage up and down a tower. The at least one sheave is positioned to guide the drive cable along the tower.

An elevator system for a tower is disclosed. The elevator system comprises at least one carriage. A drive system is configured to move the carriage up and down the tower. The drive system comprises a winch directly and operably coupled to a drive motor and a least one sheave. A drive cable is wound around the winch and at least one sheave. The drive cable is configured to couple to the carriage. The winch is configured to drive the drive cable to move the carriage. The at least one sheave is positioned to guide the drive cable along the tower.

A freestanding tower extending along a vertical axis is disclosed. The freestanding tower comprises a plurality of rails extending along at least one rail axis parallel or substantially parallel to the vertical axis. At least one carriage is moveably mounted to the plurality of rails. A drive system is configured to move the carriage up and down the tower along at least one rail axis. The drive system comprises a winch directly and operably coupled to a drive motor and at least one sheave. A drive cable is wound around the winch and at least one sheave. The drive cable is configured to couple to the carriage. The winch is configured to drive the drive cable to move the carriage. The at least one sheave is positioned to guide the drive cable along the tower.

DETAILED DESCRIPTION

Figure 1:
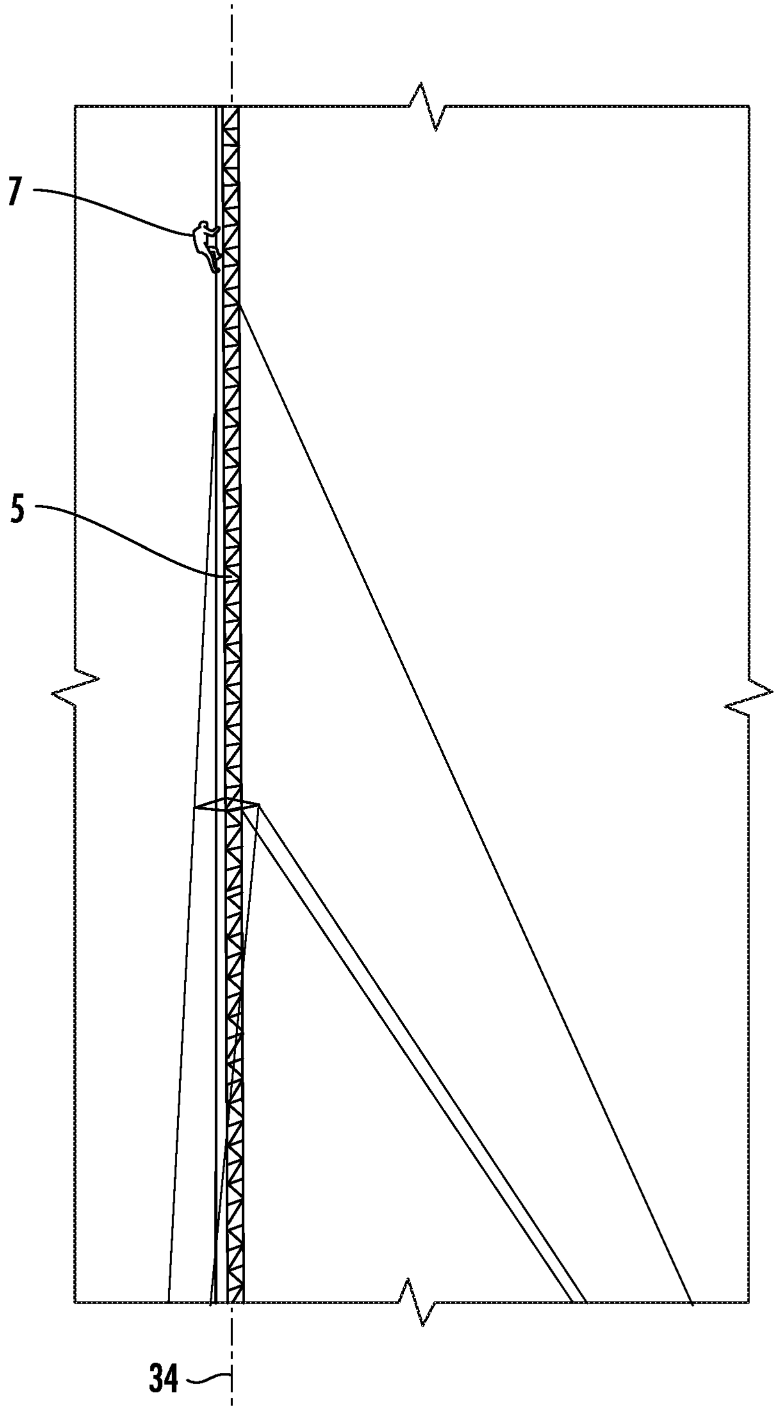
FIG. 1 PRIOR ART
FIG. 1 is an example of a technician climbing an example tower.

The present disclosure can be understood more readily by reference to the accompanying detailed description, which includes examples, claims and drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" can optionally include plural referents unless the context clearly dictates otherwise. For example, use of the term "a channel" can represent disclosure of embodiments in which only a single channel is provided, and unless the context dictates otherwise, can also represent disclosure of embodiments in which a plurality of such channels are provided.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, use of "substantially" (e.g., "substantially parallel") or "generally" (e.g., "generally planar") should be understood to include embodiments in which angles are within ten degrees, or within five degrees, or within one degree.

The word "or" as used herein means any one member of a particular list and, in alternative embodiments, unless context dictates otherwise, can include any combination of members of that list.

The terms "horizontal" and "vertical" as used herein may refer to directions or orientations relative to an assumed normal installed position of the device and/or system (for example, a tower), unless otherwise indicated. "Horizontal" generally refers to a direction or plane that is substantially parallel to the ground or supporting surface when the device and/or system is in an installed or use position. "Vertical" generally refers to a direction or plane that is substantially perpendicular to the ground or supporting surface when the device and/or system is in an installed or use position. It will be appreciated that these terms are used for ease of understanding and are not intended to be limiting, as the device may be oriented differently in actual use.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the device, systems, and associated methods can be implemented and used without employing these specific details. Indeed, the device, systems, and associated methods can be placed into practice by modifying the illustrated device, systems, and associated methods and may be used in conjunction with any other apparatus and techniques conventionally used in the industry.

Figure 2:
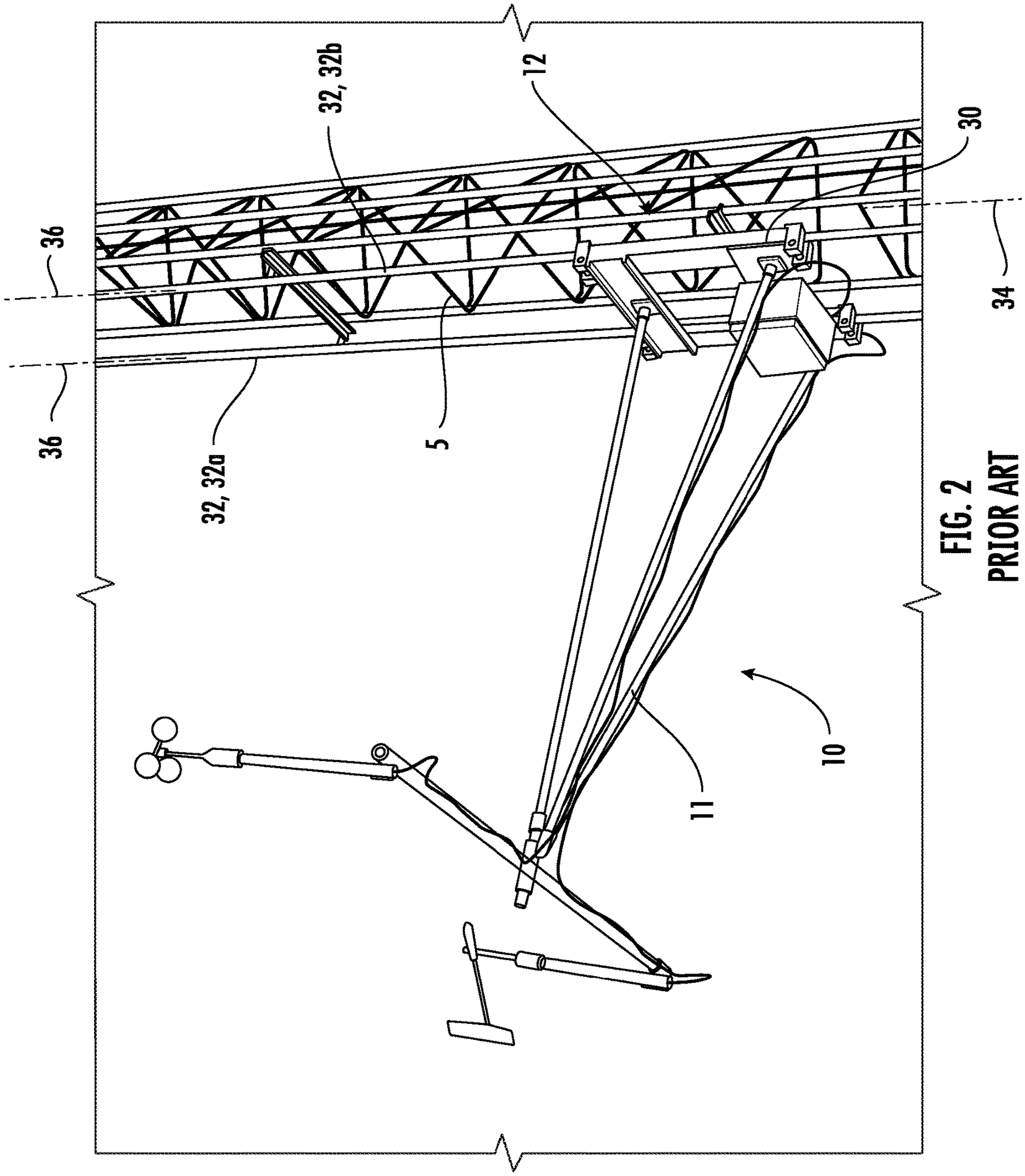
FIG. 2 PRIOR ART
FIG. 2 is an example carriage carrying instruments on an example elevator system.
Figure 4:
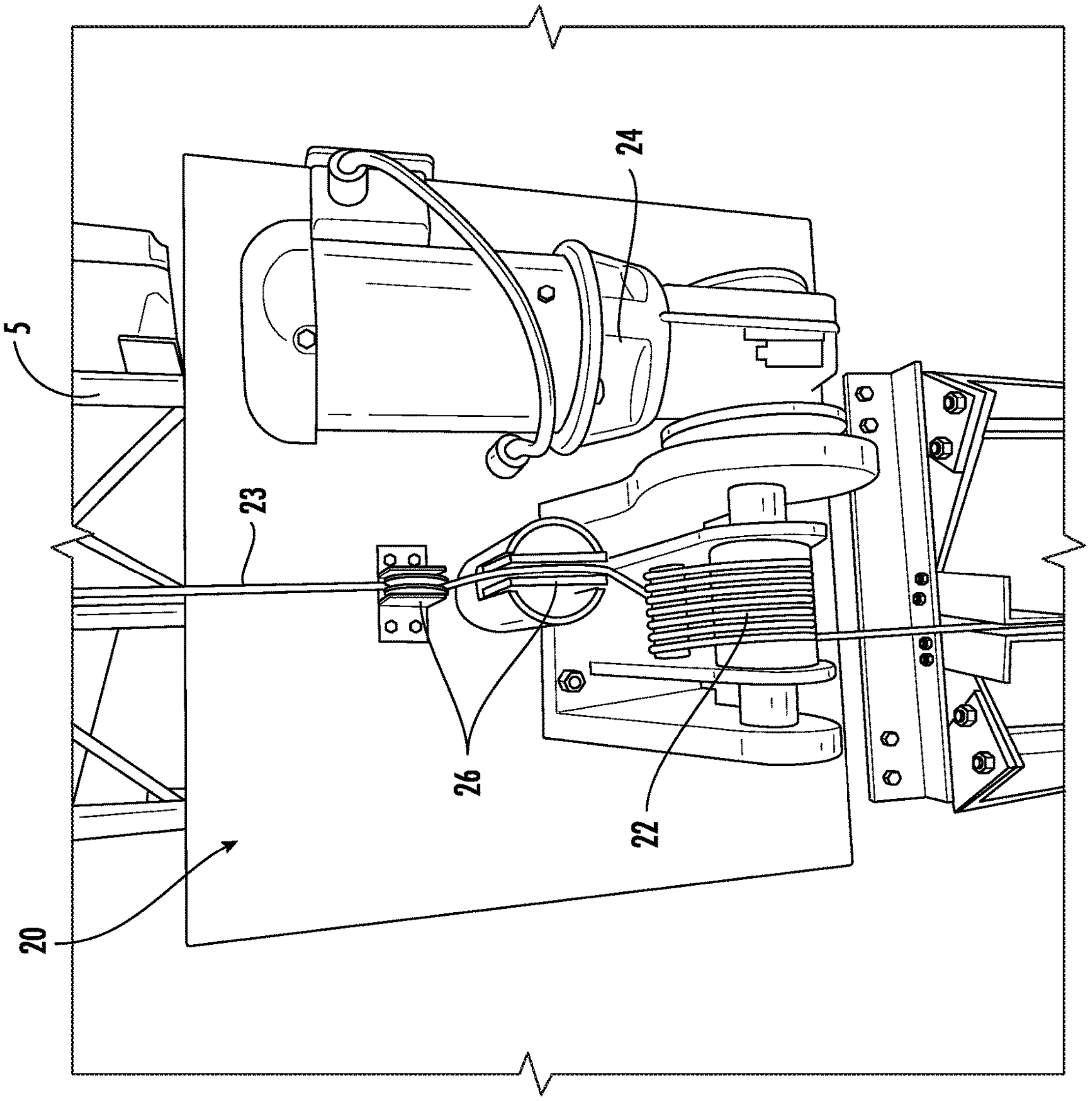
FIG. 4 is an example drive system according to the disclosure.

As shown in FIG. 4, a drive system 20 for an elevator system for moving instruments on a tower is disclosed. The drive system 20 may be configured to raise and lower the instrument(s) (for example, an instrument 10 as shown in FIG. 2) on a tower (for example, a tower 5 as shown in FIGS. 1 and 2). The tower 5 (example shown in FIGS. 1 and 2) extends along a vertical or substantially vertical (for example, within 25° of vertical) axis 34. The instruments 10 may be mounted on the tower 5 at a predetermined level along the vertical axis 34. Several different types of instrumentation may be mounted on the tower including, for example, a boom 11 (as shown in FIGS. 2 and 7) for mounting equipment; a meteorological monitoring station comprising equipment and/or sensors for monitoring windspeed, wind direction, temperature, combinations thereof, or the like; a gas analyzer such as a NOx monitor; and/or a high-volume sampler for particular measurements.

Figure 7:
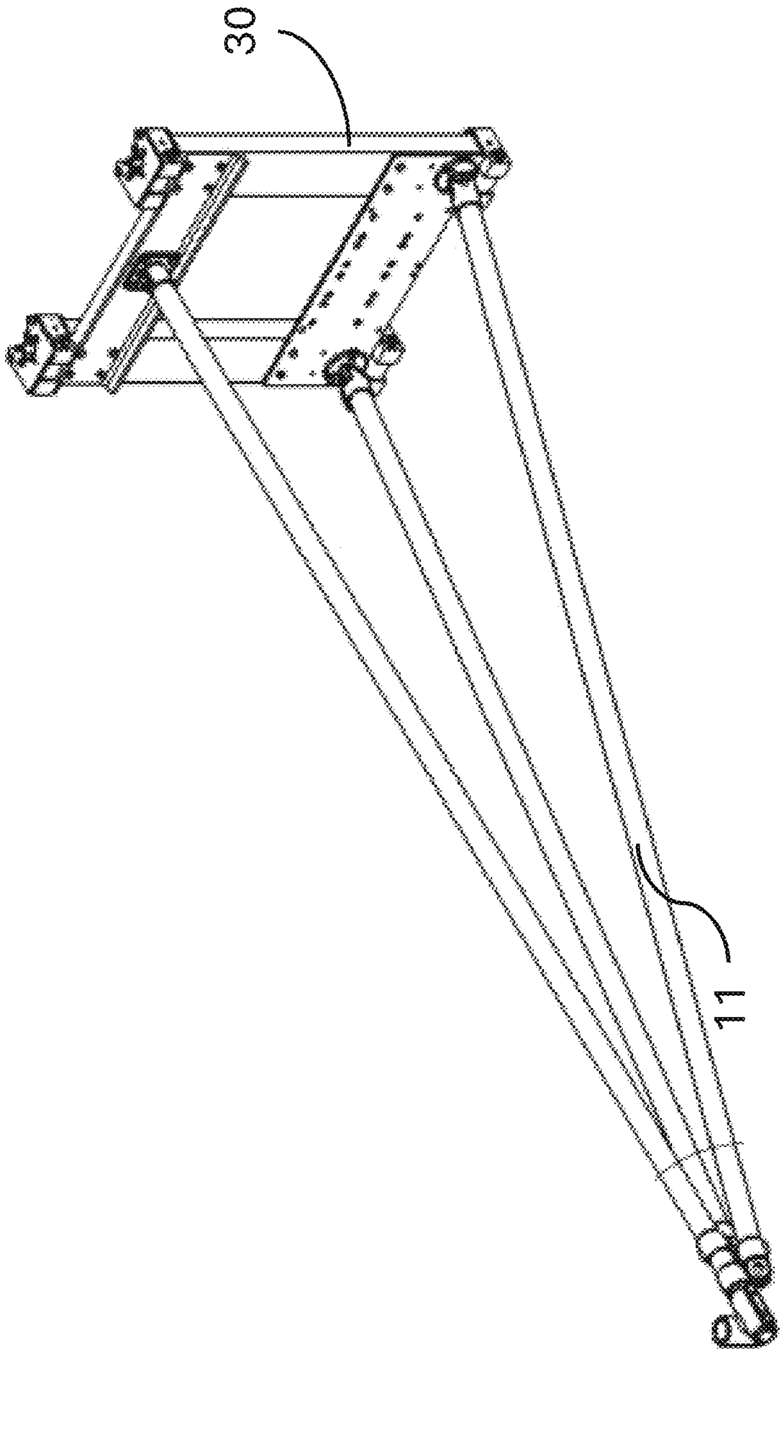
FIG. 7 is a diagram of an example carriage and instrument according to the disclosure.

As shown in FIGS. 2 and 7, the instrument(s) may be mounted to at least one carriage 30. Optionally, each carriage 30 may be rectangularly shaped. Each carriage 30 may be designed to support instruments and to accommodate mounting hardware to secure the instrument(s) to the carriage 30. Optionally, each carriage 30 may carry up to 150 lbs. The carriage 30 may be configured to be moveably mounted to the tower 5 (for example, as shown in FIG. 2). Each carriage 30 may comprise at least one roller to allow the carriage 30 to move along the tower 5. Optionally, each carriage 30 comprises a set of rollers (optionally, a set of rollers comprises 3 rollers) at each corner of the carriage. As shown in FIG. 2, the carriage 30 may be moveably mounted to the tower 5 via a plurality of guide rails 32. For example, the rollers on the carriage may allow the carriage 30 to move along the guide rails 32. Optionally, each guide rail 32 may be a a tubular aluminum rail (e.g., a 1.25 inch diameter tubular aluminum rail). Each guide rail 32 may extend along a guide rail axis 36. Each guide rail axis 36 may extend parallel or substantially parallel (for example, within 10° of parallel) to the vertical axis 34 of the tower 5. Each carriage 30 may be configured to move up and down the tower 5 along each guide rail axis 36. As shown in FIG. 2, the system may comprise a first guide rail 32*a* and a second guide rail 32*b*. The first guide rail 32*a* and the second guide rails 32*b* may be spaced apart along an axis perpendicular or substantially perpendicular (for example, within 10° of perpendicular) to the guide rail axis 36. The spacing between the guide rails 32*a*, 32*b* may provide horizontal stability.

Figure 3:
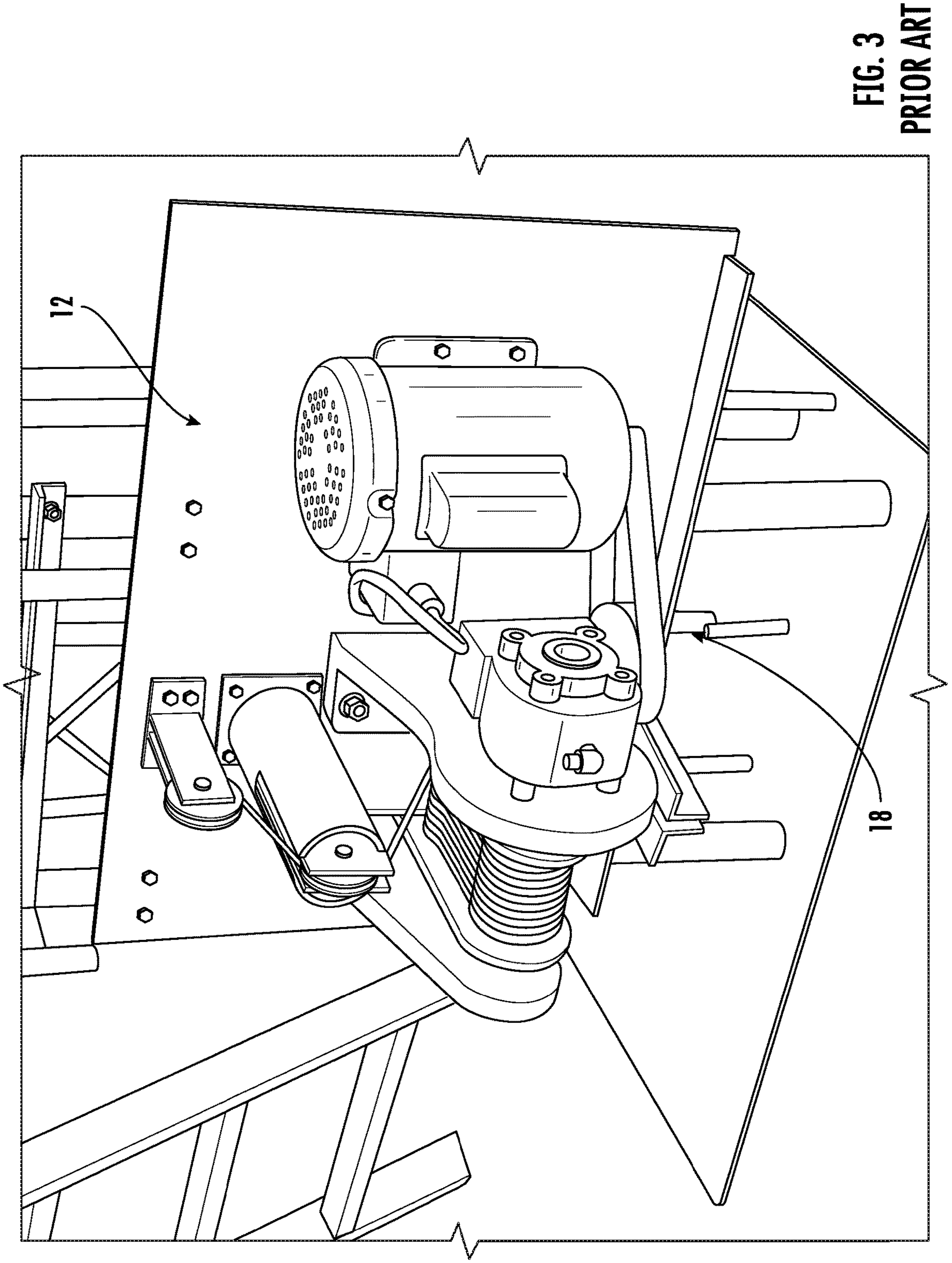
FIG. 3 PRIOR ART
FIG. 3 is an example drive system comprising a pulley and belt system.

In contrast to the prior art systems disclosed above and depicted in FIGS. 1-3, the drive system 20 may be configured to allow the instrument(s) that is mounted on the tower to be brought down to ground level for servicing without the necessity of climbing the tower or climbing a structure (for example, a ladder) to reach the instruments. As further described below, the drive system 20 may also ensure precision in obtaining a vertical profile of the monitored parameters by providing a reliable means of transporting the instrument(s) up and down the tower, even while the instrument is in operation. Optionally, vertical profile data may be gathered via (1) a small transmitter attached to the instrument to transmit the data to a ground-based receiver; (2) communicating the profile data to the ground via a cable; and/or (3) retrieving the profile data via a recorder communicatively coupled to the instrument when the instrument is returned to ground level.

Figure 5:
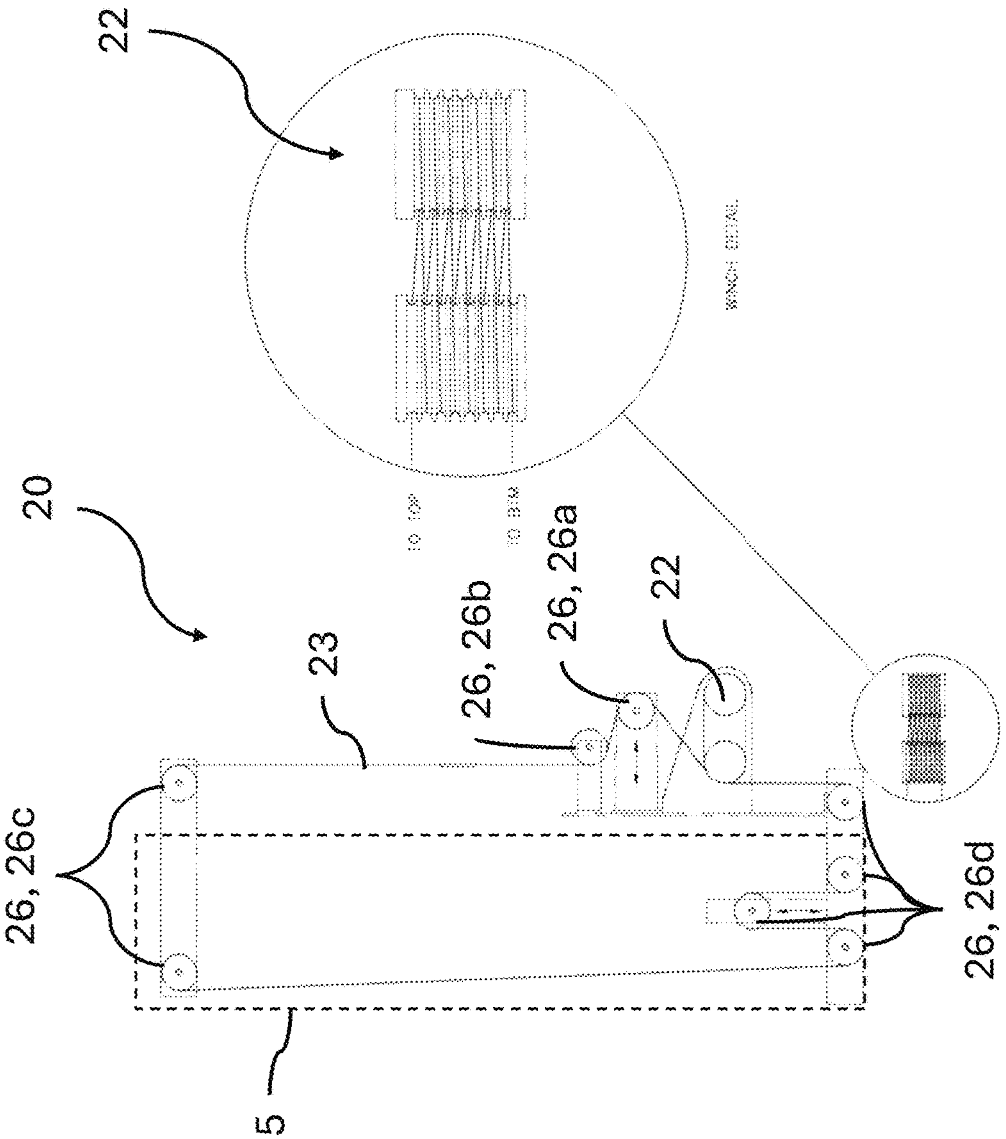
FIG. 5 is a diagram of an example drive system according to the disclosure.

As shown in FIGS. 4 and 5, the drive system 20 comprises a drive cable 23. The drive cable 23 may be an endless cable loop. The drive cable 23 is configured to couple to the at least one carriage 30. Optionally, the carriage 30 may be secured to the drive cable 23 with at least one removable clamp to allow the operator to remove the carriage 30 from the tower 5 as it comes down. If there are a plurality of carriages 30, as each carriage is removed, the carriages above it can be brought down and removed sequentially. The reverse procedure may be followed to replace the carriages. The drive cable 23 may be marked so the operator can replace each carriage at its proper position on the drive cable 23 as marked.

Figure 6:
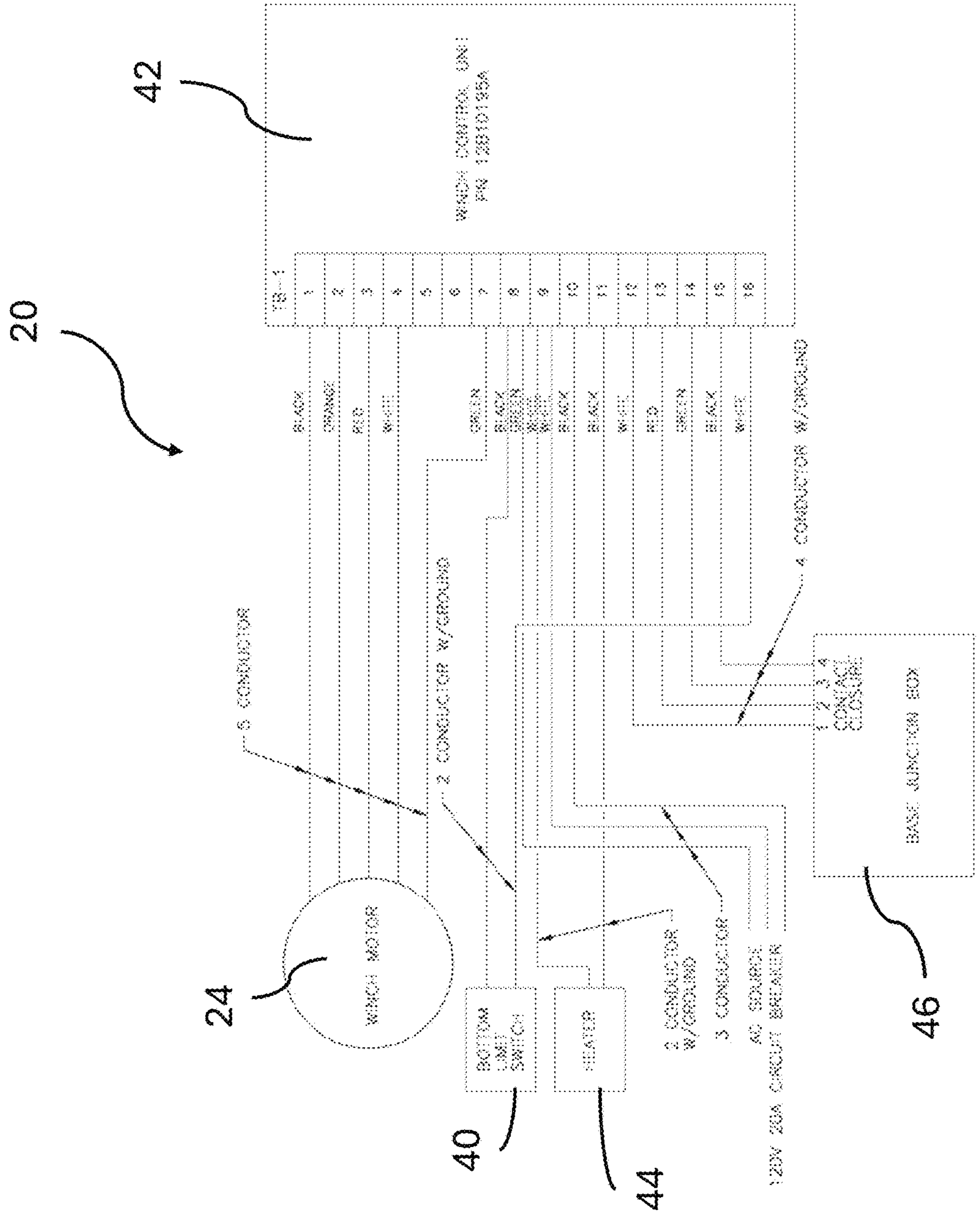
FIG. 6 is a block diagram of an example drive system according to the disclosure.

As shown in FIGS. 4-6, the drive system 20 comprises a winch 22. The drive cable 23 is wound around the winch 22. The winch 22 may be a reversible, dual-drum winch. Optionally, the system 20 may comprise a single winch 22 (only one winch 22). The winch 22 is operably coupled to a drive motor 24. The winch 22 may be directly coupled to the drive motor 24. Directly coupled may mean a shaft of the motor is coupled to the winch drum or gearbox without using belts, chains, or other intermediate mechanical linkages. The shaft of the motor may be directly coupled to a winch drum shaft or gearbox input shaft of the winch (optionally via a coupling). The drive system 20 may not include a belt or pulley system. For example, the winch 22 may not be coupled to the drive motor 24 via a belt system. Because the drive system 20 does not include pulley or belt systems, and instead, the winch 22 is directly coupled to the drive motor 24, thus creating a closed system wherein the moving parts are enclosed and protected from the environment, the drive system 20 may have improved reliability and longevity compared to systems including pulley or belt systems, which are more likely to rust, dry rot, be damaged by animals, etc. because these systems have components such as belts or rings that are exposed to the environment and elements. Further, the drive system 20 may require less physical space, thereby allowing the carriage(s) 30 to travel closer to the ground than permitted by elevator systems including pulley or belt-based drive systems.

The winch 22 and drive motor 24 drive the drive cable 23, which in turn can move the carriage(s) 30 up and down the tower 5. The winch is configured to drive an endless cable loop that powers the carriages. With this technique, the carriages 30 may be safely and smoothly powered up and down the tower 5 without the nuisance of two winches or loose, uncoiled cable. The winch 22 may drive the drive cable 23 at approximately 20 feet per minute to provide a smooth ascent or descent for the instruments. The winch drive motor 24 may comprise an electrical braking circuit that prevents the carriage(s) 30 from traveling more than a predetermined amount after tuning the winch 22 off. For example, the electrical braking circuit may prevent the carriage(s) 30 from traveling more than 0.5 inch after turning the winch 22 off. As shown in FIG. 6, the drive system 20 may comprise at least one limit switch 40 to stop the carriage(s) 30 at a desired position. Additional control circuitry and switches can be incorporated to automatically sequence the system at predetermined times, such as cycling to the top and backing down at given intervals for vertical profile studies.

As shown in FIG. 5, the drive system 20 comprises at least one sheave 26. The drive cable 23 is wound around the winch 22 and at least one sheave 26. The sheaves 26 are positioned to guide the drive cable 23 along the tower 5 and to provide tension in the drive cable 23 as needed to prevent loose, uncoiled cable. A first sheave **26*a* may be a spring-tensioned sheave configured to maintain tension on the drive cable 23 thereby eliminating or reducing problems from cable stretch, thermal contraction, or expansion. The endless drive cable loop may run from the winch 22 over the first sheave 26*a*. A second sheave 26*b* may be an idler sheave and may position the drive cable 23 and provide tension on the drive cable 23. The drive cable 23 may run from the first sheave 26*a* over the second sheave 26*b* and up the face of the tower 5 to a top sheave assembly 26*c*. The drive cable 23 may run over the top sheave assembly 26*c* and come down inside the tower 5 to a bottom sheave assembly 26*d*. The bottom sheave assembly 26*d* may comprise idler sheaves and a sheave used as a manual tensioning device to provide more tension in the drive cable 23** as needed.

As shown in FIG. 6, the system 20 may comprise cables, connectors, and junction boxes to control the operation of the elevator. The cabling may comprise an automatic electrical connector assembly configured to allow the carriage(s) 30 to be lowered to ground level while leaving the electrical cables securely fastened to the tower 5. The carriage(s) 30 may comprise at least one junction box comprising at least one terminal strip. Cables from individual sensors may be coupled to the at least one terminal strip. A first electrical connector may comprise the at least one terminal strip. A second electrical connector may be mounted at predetermined positions on the tower 5 along the vertical axis. The first electrical connector may be configured to mate with the second electrical contact. Optionally, the first electrical connector may be a male connector (for example, a spring-loaded plunger) and the second electrical connector may be a female connector. In this example, the at least one terminal strip may be connected to the end of the male connector. The second connector may be configured to automatically mate with the first connector when the carriage reaches the predetermined position of the second connection on the tower 5. The other end of the cable may terminate at least one terminal strip in a junction box 46 at a base of the tower 5. This junction box 46 may terminate the cables on terminal strips and may house the automatic and manual controls for a control unit. When the carriage(s) is in operating position, the plunger assembly may provide a continuous force on the connector, assuring a weatherproof seal and continuous electrical contact. The motor and winch may be configured to stop when the first connector mates with a second connector.

As shown in FIG. 6, the system 20 may comprise a control unit 42. The control unit 42 may comprise a drum switch configured to control the drive motor 24. The control unit 42 may comprise at least one operating controls including, for example, power circuit breaker, power sensor and indicator, contact sensor and indicator, heater controls, winch controls, position controls, and/or override controls. The power circuit breaker may provide a means of turning the system on and off at the same time as it provides overload protection. The power sensor and indicator may sense whether power is running to the system and provide an indication (optionally, visual and/or auditory) when the power is on. The contact sensor and indicator may sense when carriage connectors are in contact and indicate (optionally, by visual and/or auditory indication) when the carriage connectors are in contact. The heater controls may control a heater 44 for heating the connector assemblies for de-icing. The winch controls may enable the operator to control, including starting and stopping, the drive system. The position controls may enable the operator to select the direction and movement of the drive system. The override controls may enable the operator to force the drive unit to continue after the drive unit has stopped.

Figure 8:
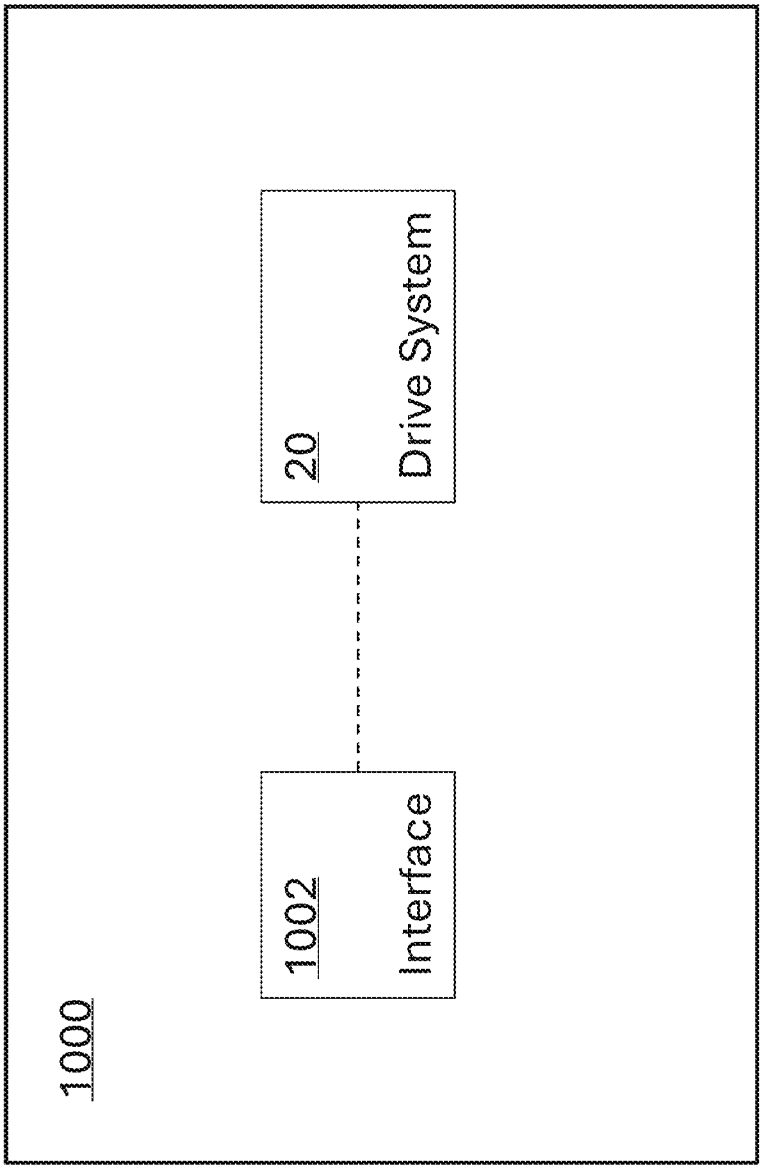
FIG. 8 is a diagram of an example control system according to the disclosure.

FIG. 8 shows an example control system 1000 comprising the drive system 20 communicatively coupled to an interface 1002 configured to receive input from an operator to control the drive system 20. Optionally, the interface 1002 may be part of or operably coupled to the control unit 42. Optionally, the interface 1002 may be part of or operably coupled to a computing device. Optionally, the control unit 42 may be operably coupled to the computing device. Optionally, the computing device 1001 may be configured to operate the driving system 20.

Figure 9:
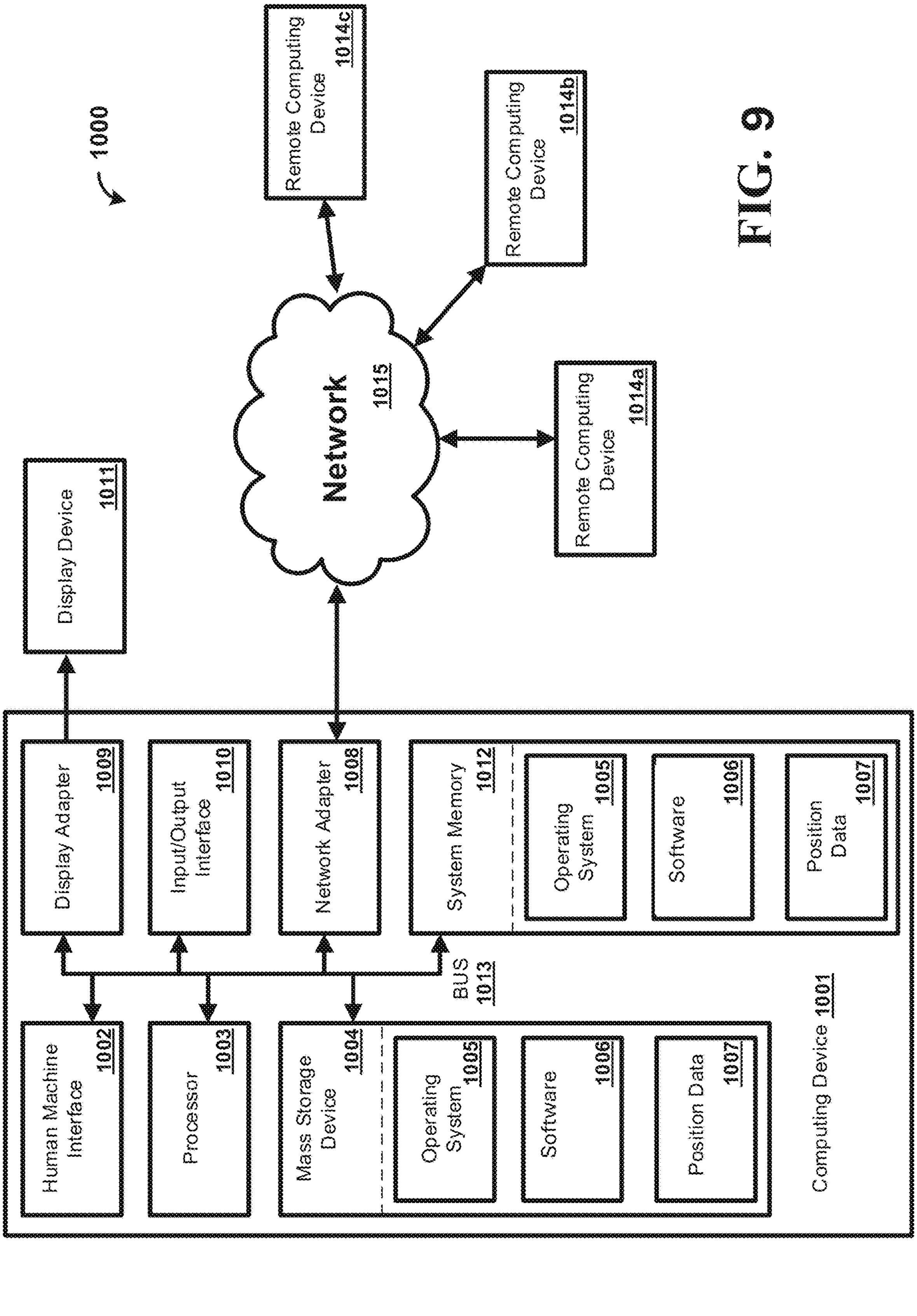
FIG. 9 is a block diagram of the example control system comprising a computing device as disclosed herein.

FIG. 9 shows the example control system 1000 including an exemplary configuration of the computing device 1001. The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing. The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as position data 1007 (for example, position of the thumb including specific joints) and/or program modules such as operating system 1005, and software 1006.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Any number of program modules may be stored on the mass storage device 1004. An operating system 1005 and software 1006 may be stored on the mass storage device 1004.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a, b, c*. A remote computing device 1014*a, b, c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. The remote computing devices 1014*a, b, c*, can perform respective operations of the system. Logical connections between the computing device 1001 and a remote computing device 1014*a, b, c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a, b, c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

A method of using the system 20 is disclosed herein. The system may include any or all of the details described herein. The method may comprise causing, via the control unit 42, the motor to drive the winch to drive the drive cable to raise at least one carriage on a tower. The method may comprise causing, via the control unit 42, the motor to drive the winch to drive the drive cable to lower at least one carriage on a tower. The method may comprise lowering the at least one carriage on the tower to ground lever such that a technician may access the at least one carriage without the need to climb the tower or to climb another structure (for example, a ladder). The method may comprise lowering the at least one carriage on the tower to components on the carriage that need to be accessed are within 6 feet above the ground. The method may comprise lowering the at least one carriage on the tower to where components on the carriage are within 6 feet above the ground.

It is expected that the example drive system, elevator system, tower, and corresponding methods as disclosed herein will allow instruments mounted on a tower to be raised and lowered on the tower. It is expected that the example drive system may be more reliable and have a longer longevity than known drive systems while providing technicians access to the instruments at a lower position near to the ground without the need for significant climbing (or, optionally, to eliminate the need for any climbing).

Exemplary Aspects

In view of the described device, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A drive system for a tower elevator comprising:

a winch directly and operably coupled to a drive motor;

at least one sheave; and a drive cable wound around the winch and at least one sheave, the drive cable configured to couple to a carriage, wherein the winch is configured to drive the drive cable to move the carriage up and down a tower, and wherein the at least one sheave is positioned to guide the drive cable along the tower.

Aspect 2: The drive system according to aspect 1, wherein the winch is a reversible, dual-drum winch.

Aspect 3: The drive system according to aspect 1 or aspect 2, wherein the drive cable is an endless cable loop.

Aspect 4: The drive system according to any of the preceding aspects, wherein a first sheave of the at least one sheave is a spring-tensioned sheave configured to maintain tension on the drive cable.

Aspect 5: The drive system according to aspect 4, wherein at least one second sheave of the at least one sheave is an idler sheave.

Aspect 6: The drive system according to aspect 5, wherein the first sheave and the at least one second sheave are positioned vertically above the winch.

Aspect 7: The drive system according to aspect 6, wherein the at least one sheave comprises a top sheave assembly positioned vertically above the first sheave and the at least one second sheave.

Aspect 8: The drive system according to aspect 7, wherein the at least one sheave comprises a bottom sheave assembly, wherein the bottom sheave assembly is positioned vertically below the winch.

Aspect 9: The drive system according to any of the preceding aspects, wherein there is only one winch.

Aspect 10: The drive system according to any of the preceding aspects, wherein the drive system does not include a pulley or belt system.

Aspect 11: The drive system according to any of the preceding aspects, wherein the motor comprises a shaft, wherein the shaft of the motor is directly coupled to a winch drum shaft or gearbox input shaft of the winch.

Aspect 12: An elevator system for a tower comprising:

at least one carriage; and a drive system configured to move the carriage up and down the tower, the drive system comprising:

a winch directly and operably coupled to a drive motor;

at least one sheave; and a drive cable wound around the winch and at least one sheave, the drive cable configured to couple to the carriage, wherein the winch is configured to drive the drive cable to move the carriage; and wherein the at least one sheave is positioned to guide the drive cable along the tower.

Aspect 13: The elevator system according to aspect 12, wherein the at least one carriage is configured to support instruments.

Aspect 14: The elevator system according to aspect 13, wherein the instruments comprise at least one of a meteorological monitoring station, a gas analyzer, or a high-volume sampler for particular measurements.

Aspect 15: The elevator system according to any of aspects 12-14 further comprising a plurality of guide rails configured to be mounted on the tower, wherein the at least one carriage is configured to moveably mount to the plurality of guide rails.

Aspect 16: The elevator system according to any of aspects 12-15, wherein the drive system does not include a pulley or belt system.

Aspect 17: The elevator system according to any of aspects 12-16, wherein the motor comprises a shaft, wherein the shaft of the motor is directly coupled to a winch drum shaft or gearbox input shaft of the winch.

Aspect 18: A freestanding tower extending along a vertical axis, the freestanding tower comprising:

a plurality of rails extending along at least one rail axis parallel or substantially parallel to the vertical axis;

at least one carriage moveably mounted to the plurality of rails; and a drive system configured to move the carriage up and down the tower along at least one rail axis, the drive system comprising:

a winch directly and operably coupled to a drive motor;

at least one sheave; and a drive cable wound around the winch and at least one sheave, the drive cable configured to couple to the carriage, wherein the winch is configured to drive the drive cable to move the carriage; and wherein the at least one sheave is positioned to guide the drive cable along the tower.

Aspect 19: The freestanding tower according to aspect 18, wherein the drive system does not include a pulley or belt system.

Aspect 20: The freestanding tower according to aspect 18 or aspect 19, wherein the motor comprises a shaft, wherein the shaft of the motor is directly coupled to a winch drum shaft or gearbox input shaft of the winch.

What is claimed is:

1. A drive system for an elevator of a tower, the drive system comprising:

a drive motor;

a winch directly and operably coupled to the drive motor, wherein the winch is not coupled to the drive motor via a pulley or belt system, and wherein the motor comprises a shaft that is directly coupled to a winch drum shaft or gearbox input shaft of the winch, wherein the winch and the drive motor are positioned exterior to the tower, and wherein the winch and the drive motor are mounted at a fixed position relative to the tower;

at least one sheave; and a drive cable wound around the winch and the at least one sheave, the drive cable configured to couple to a carriage, wherein the winch is configured to drive the drive cable to move the carriage up and down along an exterior of the tower, and wherein the at least one sheave is positioned to guide the drive cable along the tower.

2. The drive system according to claim 1, wherein the winch is a reversible, dual-drum winch.

3. The drive system according to claim 1, wherein the drive cable is an endless cable loop.

4. The drive system according to claim 1, wherein a first sheave of the at least one sheave is a spring-tensioned sheave configured to maintain tension on the drive cable.

5. The drive system according to claim 4, wherein at least one second sheave of the at least one sheave is an idler sheave.

6. The drive system according to claim 5, wherein the first sheave and the at least one second sheave are positioned vertically above the winch.

7. The drive system according to claim 6, wherein the at least one sheave comprises a top sheave assembly positioned vertically above the first sheave and the at least one second sheave.

8. The drive system according to claim 7, wherein the at least one sheave comprises a bottom sheave assembly, wherein the bottom sheave assembly is positioned vertically below the winch.

9. The drive system according to claim 8, further comprising top and bottom sheave assemblies, wherein the endless cable loop runs from the winch, along a face of the tower to the top sheave assembly, returns inside the tower to the bottom sheave assembly, and returns from the bottom sheave assembly back to the winch.

10. The drive system according to claim 1, wherein the drive system only includes a single winch.

11. The drive system according to claim 1, wherein the drive cable consists of a single drive cable.

12. An elevator system for a tower, the elevator system comprising:
- a carriage; and
- a drive system configured to move the carriage up and down the tower, the drive system comprising:
  - a drive motor;
  - a winch directly and operably coupled to the drive motor, winch is not coupled to the drive motor via a pulley or belt system, and wherein the motor comprises a shaft that is directly coupled to a winch drum shaft or gearbox input shaft of the winch, wherein the winch and the drive motor are positioned exterior to the tower, and wherein the winch and the drive motor are mounted at a fixed position relative to the tower;
  - at least one sheave; and
  - a drive cable wound around the winch and the at least one sheave, the drive cable coupled to the carriage,
  - wherein the winch is configured to drive the drive cable to move the carriage along an exterior of the tower; and
  - wherein the at least one sheave is positioned to guide the drive cable along the tower.

13. The elevator system according to claim 12, wherein the carriage is configured to support at least one instrument.

14. The elevator system according to claim 13, wherein the at least one instrument comprises at least one of a meteorological monitoring station, a gas analyzer, a high-volume sampler for particular measurements, or a combination thereof.

15. The elevator system according to claim 12 further comprising a plurality of guide rails mounted on the tower, wherein the carriage is moveably coupled to the plurality of guide rails.

16. A freestanding tower extending along a vertical axis, the freestanding tower comprising:
- a plurality of rails extending along at least one rail axis parallel or substantially parallel to the vertical axis;
- a carriage moveably coupled to the plurality of rails; and
- a drive system configured to move the carriage up and down the tower along the at least one rail axis, the drive system comprising:
  - a drive motor;
  - a winch directly and operably coupled to the drive motor, winch is not coupled to the drive motor via a pulley or belt system, and wherein the motor comprises a shaft, wherein the shaft of the motor is directly coupled to a winch drum shaft or gearbox input shaft of the winch;
  - wherein the winch is mounted at a fixed position relative to the tower;
  - at least one sheave; and
  - a drive cable wound around the winch and the at least one sheave, the drive cable coupled to the carriage,
  - wherein the winch is configured to drive the drive cable to move the carriage along an exterior of the tower; and
  - wherein the at least one sheave is positioned to guide the drive cable along the tower.

17. The freestanding tower according to claim 16, wherein the freestanding tower is a lattice tower.

* * * * *